Figure 5:
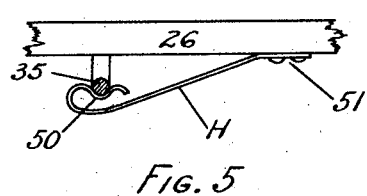

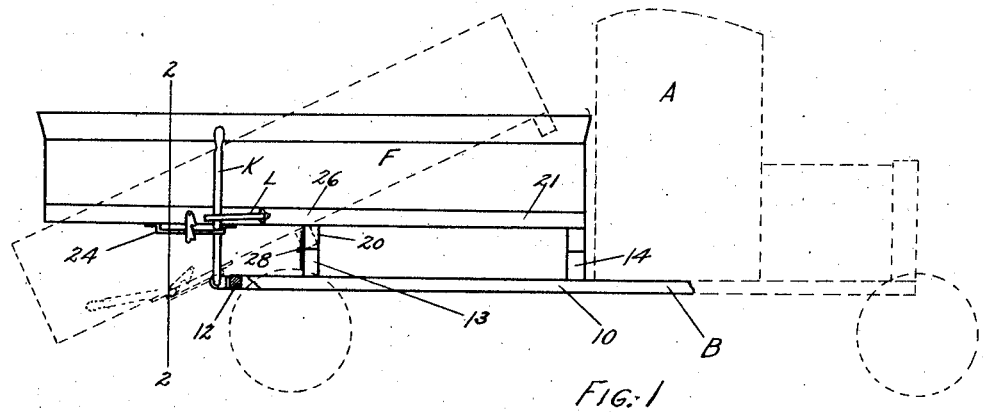
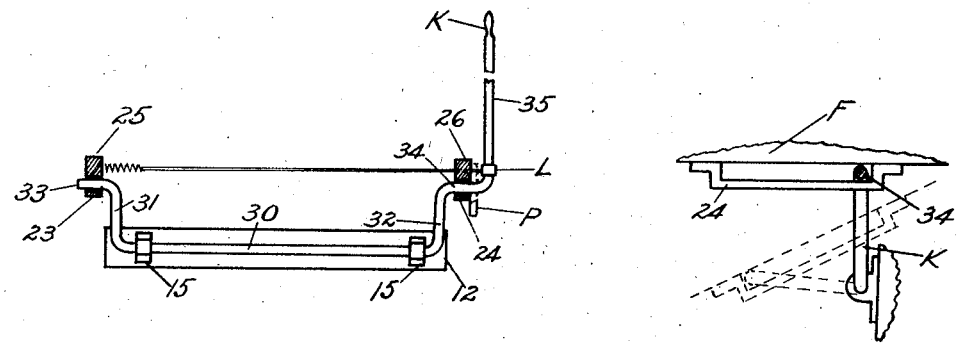
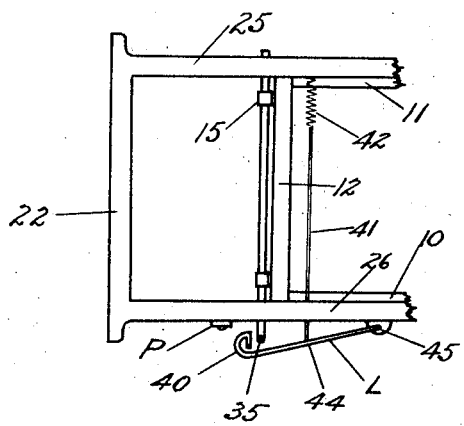

W. F. LAWES.
DUMPING DEVICE.
APPLICATION FILED SEPT. 7, 1918.

1,328,928.

Patented Jan. 27, 1920.
2 SHEETS—SHEET 2.

Inventor
William F. Lawes
by Gardner W. Pearson
attorney

UNITED STATES PATENT OFFICE.

WILLIAM F. LAWES, OF BEDFORD, NEW HAMPSHIRE.

DUMPING DEVICE.

1,328,928.  Specification of Letters Patent.  Patented Jan. 27, 1920.

Application filed September 7, 1918. Serial No. 253,042.

*To all whom it may concern:*

Be it known that I, WILLIAM F. LAWES, of Bedford, in the county of Hillsborough and State of New Hampshire, have invented certain new and useful Improvements in Dumping Devices, of which the following is a specification.

This invention relates to bodies of vehicles which are arranged to tip up so that their load can be dumped.

My device is for the purpose of readily tipping up or dumping such bodies by hand, and is also of such character that it holds the body in the raised position.

It is particularly useful when used in connection with automobile trucks, but it may be used in connection with dump carts or any other similar vehicle. It can most conveniently be used in connection with a substantially box-shaped body and a rectangular chassis or frame wherein the side beams of the frame are substantially parallel with and nearly underneath the sides of the body.

I prefer to pivot the body on a support raised from the frame in such position that the front part of the body is normally heavier than the back part, and so that the back part of the body extends backward beyond the rear end of the frame.

The advantages of my construction are that the body can be extended well forward on the frame and can be set relatively low, so that there will be as much room for a load as possible, and so that this load will be well distributed.

The body of my preferred type can be attached to almost any chassis or frame, and my dumping mechanism is simple and compact and is located at the back in a position where it occupies very little room.

The parts are so arranged that to secure the necessary power for manual dumping, a long lever, pivoted to the frame, can be used, and this lever so applies force to the rear end of the body that in starting to dump a load a tremendous pressure can be applied to overcome the initial inertia.

In general, I produce the desired result by arranging a guideway or guideways at the back of the body, near the bottom, and pivot my lever substantially underneath the front end of the guideway with a portion of such dumping lever engaging a guideway or guideways whereby, when the back of the body is raised, the lever is at substantially right angles to it and a dead center is formed, thus holding the body in the up position.

When the lever is pulled back and down, its projecting part swings on an arc and forces down the guideway and the back of the body. It may be so positioned that this projection will strike the back of the guideway and limit the downward movement, and I prefer to arrange a catch or other means to hold the lever and body in the up position, and other means to lock them in a middle or in the down position.

Figure 6:
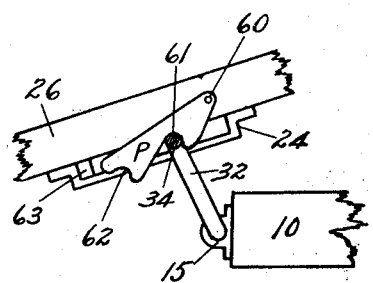
Figure 7:
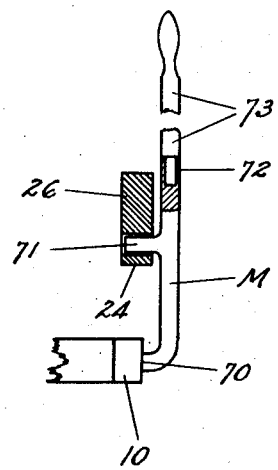
Figure 8:
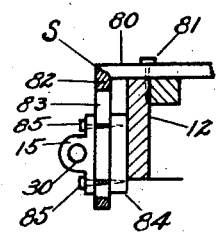

In the drawings, Figure 1 is a diagrammatical side elevation showing my device applied to the chassis or frame of an automobile, the wheels, radiator, etc., being indicated by dotted lines. Fig. 2 is a section from the left of line 2—2 of Fig. 1. Fig. 3 is an enlarged side elevation showing the relation between the guideway and dumping lever in the up and down positions. Fig. 4 is a plan view of the back ends of the side bars and back bar of the body, and the catch for holding the parts in the up position. Fig. 5 is a detail plan view showing another type of catch or locking means. Fig. 6 is a detail of a side elevation showing the operation of a stop or lock for holding the body in a half-tipped or in the down position. Fig. 7 is a detail from the rear, partly in section, showing a modification of the dumping lever. Fig. 8 is a detail of a side elevation, partly in section, of a method of adjustably attaching the dumping lever to the frame.

The truck A has the usual wheels, engine, radiator and other parts, indicated by dotted lines, and has a substantially rectangular chassis or frame B which comprises side beams 10 and 11 and a back beam 12, together with any of the usual connecting bars and braces, not shown.

The body support 13 is shown as a beam or block which extends upward across the frame at a suitable position between the front supporting block 14, which rests upon the frame and supports the front end of the body, and the back beam 12.

The rectangular box-shaped dumping body F is shown as having at the bottom side bars 25 and 26 and a back bar 22, as well as an intermediate downwardly projecting bar 20 which is hinged or otherwise pivoted at 28 to the top back edge of body support 13. Body F is preferably so hung that the part in front of the pivot line will be heavier than that behind it, so that it will normally rest with its front 21 on block 14 in the up position, as shown by the full lines in Fig. 1.

The body F is of such size and is so hung on the frame B that it overhangs or extends out back beyond back beam 12 of the frame, and under its overhanging part, to side beams 25 and 26, I locate guideways 23 and 24. These are shown as strips of sheet metal screwed or bolted in place, and so shaped that there is a groove or way extending from a point almost directly over the back part of back beam 12 backward as far as convenient.

Pivoted in hangers 15, 15, attached to back beam 12, is the dumping lever K, which is shown as formed of a metal bar which is straight at its middle portion 30 where it passes through the hangers 15, 15, and is bent upward at 31 and 32, thence outward at 33 and 34, through the guideways 23 and 24, and on one side, at 35, is again bent upward to form a handle.

As shown in Fig. 3, when lever K is pulled backward, the projecting portions 33 and 34, which engage the guideways 23 and 24, will be swung downward in an arc, as shown by the dotted lines, and will force that part of the body downward, overcoming the superior weight of the forward part of the load, if such forward part is heavier, and dump it.

When the load is dumped, handle K is forced back to a substantially vertical position and will hold the back part of the body up. To prevent the dumping lever K from shaking out of place, however, I prefer to provide means for holding it and also the back of the body in the raised position. Such means I show as a catch L, which is a straight strip 44 of wood or metal with a hook at 40, these strips being pivoted to the side bar 26 at 45 so as to engage the part 35 of handle K when in the up position. A rod or wire 41 is attached to 44 and connected with a spring 42 attached to the opposite side bar 25, and holds this catch normally in engagement with handle K.

In Fig. 5, I show a somewhat different catch H made of spring metal so bent at 50 as to engage the part 35 of lever K, and fastened at 51 to side bar 26.

On account of the fact that sometimes, when the load is being dumped, the back part falls off first, or for various other reasons, there is a tendency for the front part of the body to drop back into position, raising the rear part, I provide means for holding the dumping lever down when the back of the body is depressed.

In Fig. 6, I show such means in the form of a catch or dog P pivoted to the side bar 26. This dog has one or more notches, such as 61 and 62, adapted to engage the bent part or projection 34 of lever K, and to hold it in position so that the back of the body cannot lift, thus sliding 34 forward. This is shown as operating by gravity.

As also shown in Fig. 6, I may use at the back end of each guideway a buffer 63 of suitable material, such as rubber. The guideway or guideways may be made short enough so that the projections, such as 34, from the dumping lever will strike the back end thereof or the buffers therein before the side bars of the body strike the back beam 12 of the frame.

In Fig. 7, I show a single dumping lever M pivoted to side bar 10 at 70 and having a projection 71 which engages guideway 24. I also show such lever as having a socket 72 in which a removable handle bar 73 of any desired length can be inserted.

For convenience in attaching my device, I prefer to make the hangers 15, 15, adjustable, so that the right relation can be obtained between the dumping lever and the guideways if the body support or body block is somewhat higher or lower, or if the chassis or frame is somewhat longer or shorter.

Such adjusting means I show in Fig. 8, where S represents an angle iron having a horizontal arm 80 attached by means of screws, such as 81, to the top of back beam 12 of the frame, and a vertical arm 82 through which is a vertical slot 83. Each hanger 15 is attached to angle iron S, and therefore to back beam 12, by means of a plate 84 in back of arm 82, and to which hanger 15 is fastened by means of screws, such as 85, which pass through slot 83. By loosening screws 85 hanger 15 and plate 84 can be moved up or down, and then, by tightening screws 85, they can be clamped in place.

I claim:

1. The combination with a vehicle frame, and a body support which extends upward therefrom, of a body which extends back beyond the rear end of the frame and is so pivoted to the body support that its forward portion is normally heavier than its rear portion, guideways carried by the body at its rear part, such guideways being substantially horizontal, a dumping lever having a middle part pivoted near the rear of the frame at a point under the front ends of the guideways, and arms which extend upward therefrom and are thence so bent as to extend through the guideways and having an extension of one of said bent portions forming a handle, a releasable dog having one or more notches so pivoted to the side of the body as to engage the dumping lever when the back of the body is depressed, and a releasable catch attached to the body in position to hold the dumping lever in a substantially vertical position.

2. The combination with a vehicle frame, and a body support which extends upward therefrom, of a body which extends back beyond the rear end of the frame and is pivoted to the body support, a guideway carried by the body at its rear part, a dumping lever pivoted near the rear of the frame and extending upward therefrom having a part which engages the guideway and a handle, means to hold down the dumping lever when the back of the body is depressed, and means to hold up the dumping lever when the back of the body is raised.

3. The combination with a vehicle frame, and a body support which extends upward therefrom, of a body which extends back beyond the rear end of the frame and is so pivoted to the body support that its forward portion is normally heavier than its rear portion, guideways carried by the body at its rear part, such guideways being substantially horizontal, a dumping lever having a middle part pivoted near the rear of the frame, and arms which extend upward therefrom and thence so bent as to extend through the guideways and having an extension of one of said bent portions forming a handle, and a releasable catch attached to the body in position to hold the dumping lever in a substantially vertical position.

4. The combination with a vehicle frame, and a body support which extends upward therefrom, of a body which is pivoted to the body support, a guideway carried by the body at its rear part, a dumping lever pivoted near the rear of the frame and extending upward therefrom having a part which engages the guideway and a handle, and a releasable catch attached to the body in position to hold the dumping lever in a substantially vertical position.

5. The combination with a vehicle frame, and a body support which extends upward therefrom, of a body which extends back beyond the rear end of the frame and is pivoted to the body support, a substantially horizontal guideway carried by the body which extends back beyond the rear end of the frame, and a dumping lever pivoted near the rear end of the frame and extending upward therefrom having a handle and a part which engages the guideway.

6. The combination with a vehicle frame, of a body medially pivoted thereon in such manner as to swing up and down, a substantially straight horizontal guideway carried by the body, and a dumping lever pivoted to the frame at a point in a line extending at a right angle from the forward part of said guideway, said lever having a handle and a part which engages the guideway.

In testimony whereof I have affixed my signature.

WILLIAM F. LAWES.

Witnesses:
 EDITH V. WHITING,
 WILFRID J. LESSARD.